(12) United States Patent
Fonseca, Jr. et al.

(10) Patent No.: US 9,596,491 B2
(45) Date of Patent: Mar. 14, 2017

(54) DETECTION OF FAILURES IN ADVERTISEMENT REPLACEMENT

(71) Applicant: ARRIS Enterprises, Inc., Suwanee, GA (US)

(72) Inventors: Benedito J. Fonseca, Jr., Glen Ellyn, IL (US); Isselmou Ould Dellahy, Lake in the Hills, IL (US); Renxiang Li, Lake Zurich, IL (US); Stephen P. Emeott, Rolling Meadows, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 14 days.

(21) Appl. No.: 14/576,438

(22) Filed: Dec. 19, 2014

(65) Prior Publication Data

US 2016/0182922 A1 Jun. 23, 2016

(51) Int. Cl.
| | | |
|---|---|---|
| H04N 21/234 | (2011.01) | |
| H04N 21/24 | (2011.01) | |
| H04N 21/81 | (2011.01) | |
| H04N 21/845 | (2011.01) | |
| G11B 27/034 | (2006.01) | |
| G11B 27/28 | (2006.01) | |
| G11B 27/36 | (2006.01) | |

(52) U.S. Cl.
CPC ..... *H04N 21/23424* (2013.01); *G11B 27/034* (2013.01); *G11B 27/28* (2013.01); *G11B 27/36* (2013.01); *H04N 21/23418* (2013.01); *H04N 21/2407* (2013.01); *H04N 21/812* (2013.01); *H04N 21/8456* (2013.01)

(58) Field of Classification Search
CPC ....... H04N 21/23424; H04N 21/23418; H04N 21/2407; H04N 21/812; H04N 21/8456
See application file for complete search history.

(56) References Cited

U.S. PATENT DOCUMENTS

| | | | |
|---|---|---|---|
| 8,239,888 B2 * | 8/2012 | Todd | ................ H04N 21/23418 725/19 |
| 8,752,085 B1 | 6/2014 | Brueck et al. | |

(Continued)

FOREIGN PATENT DOCUMENTS

| | | |
|---|---|---|
| WO | 2004/080073 A2 | 9/2004 |
| WO | 2014/004955 A1 | 1/2014 |

OTHER PUBLICATIONS

PCT Invitation to Pay Additional Fees (ISA/206), Re: Application No. PCT/US2015/064953, dated Apr. 11, 2016.

(Continued)

*Primary Examiner* — Pankaj Kumar
*Assistant Examiner* — Alexander Boyd
(74) *Attorney, Agent, or Firm* — Stewart M. Wiener (57) ABSTRACT

Methods of monitoring segment replacement within a multimedia stream are provided. A multimedia stream having a replacement segment spliced therein is evaluated by extracting at least one of video, text, and audio features from the multimedia stream adjacent a beginning or ending of the replacement segment, and the extracted features are analyzed to detect if a residual of a segment replaced by the replacement segment exists within the multimedia stream. Methods of ad replacement and a system for performing the above methods are also disclosed.

15 Claims, 8 Drawing Sheets

(56) References Cited

U.S. PATENT DOCUMENTS

| | | | |
|---|---|---|---|
| 2004/0025176 A1* | 2/2004 | Franklin | H04N 21/812 725/22 |
| 2006/0195860 A1* | 8/2006 | Eldering | H04N 21/812 725/19 |
| 2006/0271947 A1* | 11/2006 | Lienhart | H04N 21/8352 725/19 |
| 2007/0157224 A1 | 7/2007 | Pouliot et al. | |
| 2009/0077580 A1 | 3/2009 | Konig et al. | |
| 2009/0097572 A1* | 4/2009 | Connery | H04N 21/23424 375/240.26 |
| 2009/0133052 A1* | 5/2009 | Badt, Jr. | H04N 21/23424 725/32 |
| 2009/0144159 A1 | 6/2009 | Bashyam | |
| 2009/0222853 A1 | 9/2009 | White et al. | |
| 2009/0260030 A1 | 10/2009 | Karlsson et al. | |
| 2010/0325657 A1 | 12/2010 | Sellers et al. | |
| 2012/0158519 A1 | 6/2012 | Edwards | |
| 2013/0205315 A1 | 8/2013 | Sinha et al. | |
| 2013/0219424 A1 | 8/2013 | Lechner et al. | |
| 2014/0031960 A1 | 1/2014 | Hill | |
| 2014/0129325 A1 | 5/2014 | Zinger et al. | |
| 2015/0143416 A1* | 5/2015 | Onno | H04N 21/4307 725/34 |
| 2015/0334434 A1* | 11/2015 | Green | H04N 21/2668 725/34 |
| 2015/0341410 A1* | 11/2015 | Schrempp | H04L 65/601 709/231 |

OTHER PUBLICATIONS

PCT Search Report & Written Opinion, Re: Application No. PCT/US2015/064953, dated Jun. 16, 2016.

* cited by examiner

DETECTION OF FAILURES IN ADVERTISEMENT REPLACEMENT

BACKGROUND

Digital video programming, such as broadcast television, often includes one or more advertisements or other non-program segments inserted between program segments. For instance, scheduled network programming may include preselected advertisements that are broadcast at specified time slots and thereby interspersed between segments of the programming. When this type of network programming is recorded, the recorded content includes the program segments in addition to the original advertisements as originally broadcast with the program segments. In some cases, the recorded content may also include marker frames at the beginning and end of the advertisements. Thus, the original advertisements will be presented during subsequent playback of such recorded content unless replaced.

Advertisement (Ad) replacement systems are used in broadcast systems to replace advertisements existing in previously recorded digital video with replacement advertisements. Such ad replacement systems are configured to detect segments such as advertisements in a video signal and to replace the detected segments with replacement advertisements, such as updated, targeted, or different advertisements. Accordingly, the result is modified programming including presentation of the original program segments with replacement advertisements interspersed therein.

Modified programming or content resulting from such ad replacement systems may exhibit imperfections. For instance, although complete replacement of an original advertisement may be desired, in some cases the original advertisement may only be partially replaced. As one example, the start of the replacement advertisement may be unintentionally offset or delayed from the actual start of the original advertisement. In this example, the replacement advertisement may not entirely overlap the original advertisement such that residual video frames from the original advertisement remain in the programming either before the start of the replacement advertisement or after the end of the replacement advertisement. The presence of such residual frames and/or residual audio or text corresponding to the residual frames is undesirable.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
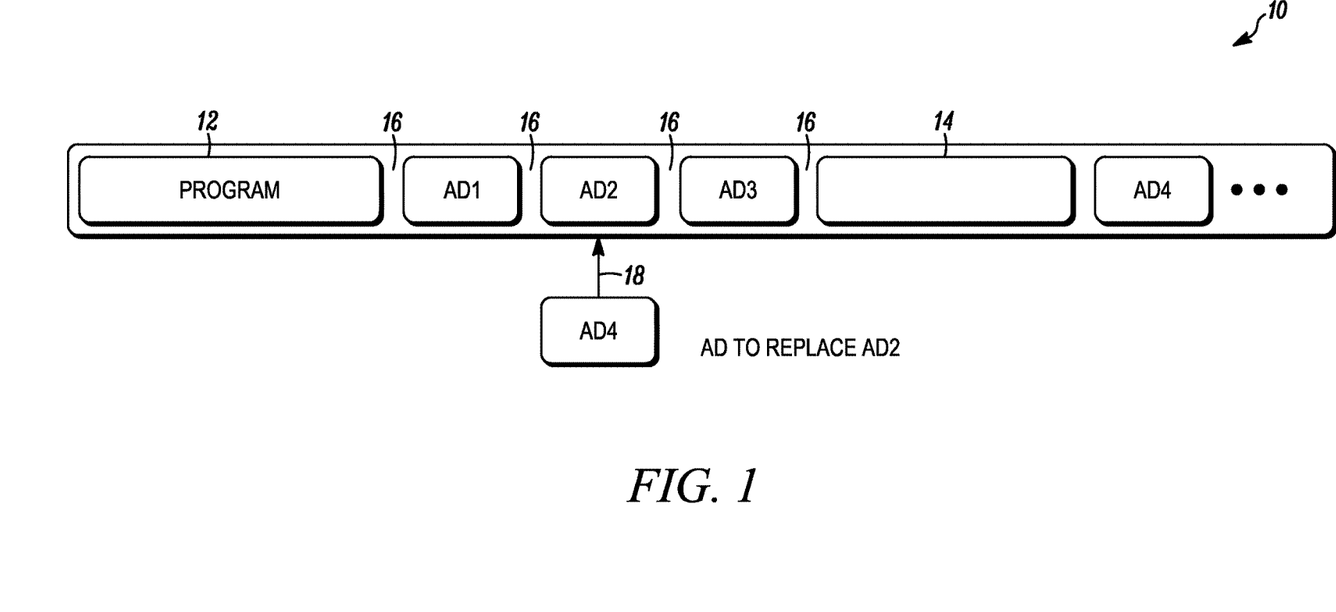
FIG. 1 is a diagram of an exemplary recorded digital video program including program segments and original advertisements in accordance to an embodiment.

FIG. 1 is a representation of a part of a multimedia stream or asset 10, for instance, as originally transmitted, aired, stored, broadcast or the like. The part of the multimedia stream or asset 10, as illustrated, includes program segments, 12 and 14, and advertisement segments, Ad1, Ad2, and Ad3 including video, audio, text and/or data. With respect to location within the stream 10, the advertisement segments Ad1, Ad2, and Ad3 are positioned in sequence directly between program segments 12 and 14 in FIG. 1. Typically, the stream 10 may also include black frames or marker frames between each of the advertisement segments Ad1, Ad2, and Ad3 and after and between the program segments, 12 and 14, and the adjacent advertisement segments. The gaps 16 shown in FIG. 1 between the segments of stream 10 represent the black or marker frames.

It may be desirable to replace at least some of the advertisement segments Ad1, Ad2 and/or Ad3 during subsequent transmitting, airing, broadcasting, or storing of the stream 10. For example, it may be desirable to replace Ad2 with Ad4 as shown by the arrow 18 in FIG. 1.

Figure 2:
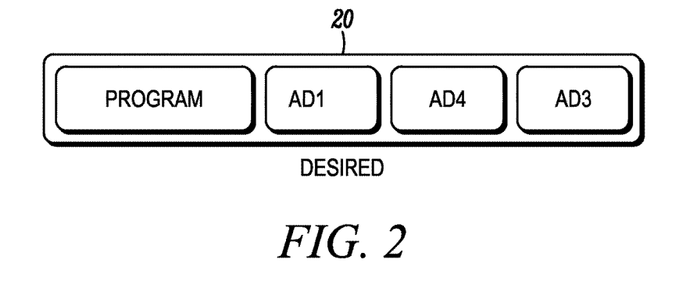
FIG. 2 is a diagram of a modified portion of the recorded digital video program of FIG. 1 including a replacement advertisement properly placed in accordance to an embodiment.
Figure 3:
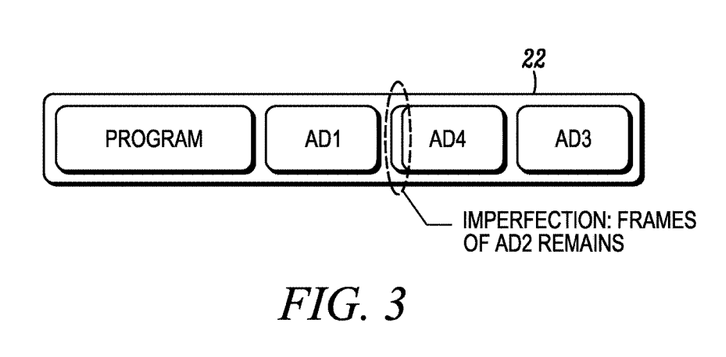
FIG. 3 is a diagram of a modified portion of the recorded digital video program of FIG. 1 including a replacement advertisement improperly placed in accordance to an embodiment.

If the replacement is accomplished as desired, the corresponding part of asset 10 will be converted as shown in FIG. 2 with Ad4 entirely replacing Ad2 with no remnant part of Ad2 remaining in the modified stream 20. However, if Ad4 is inserted into stream 10 at a slightly offset or delayed position than that shown in FIG. 2, one possible result is as shown in FIG. 3 which shows a modified stream 22 in which a residual leading part of Ad2 remains within the stream 22. In this case, the transition from Ad1 to Ad4 will be of poor quality since some of the video frames and audio of Ad2 will be shown and played directly before the commencement of the Ad4 advertisement. As another example (not shown), the offset may result when the replacement advertisement is positioned forward of the beginning of the advertisement segment being replaced. In this case, the transition at the end of the replacement advertisement may be of poor quality with some of the video frames and audio of the tail end of the replaced advertisement remaining in the stream.

Accordingly, an embodiment disclosed herein includes a system and method for diagnosing and assessing the quality of a multimedia steam having a segment thereof having been replaced with a replacement segment. As an example, the segment being replaced and the replacement segment may be advertisements. As another example, the replacement segment may be a promotional clip from a program to be aired in the future. Although advertisements are discussed herein, the segments of the stream being replaced may be any new or modified segments and are not limited to advertisements.

Figure 4:
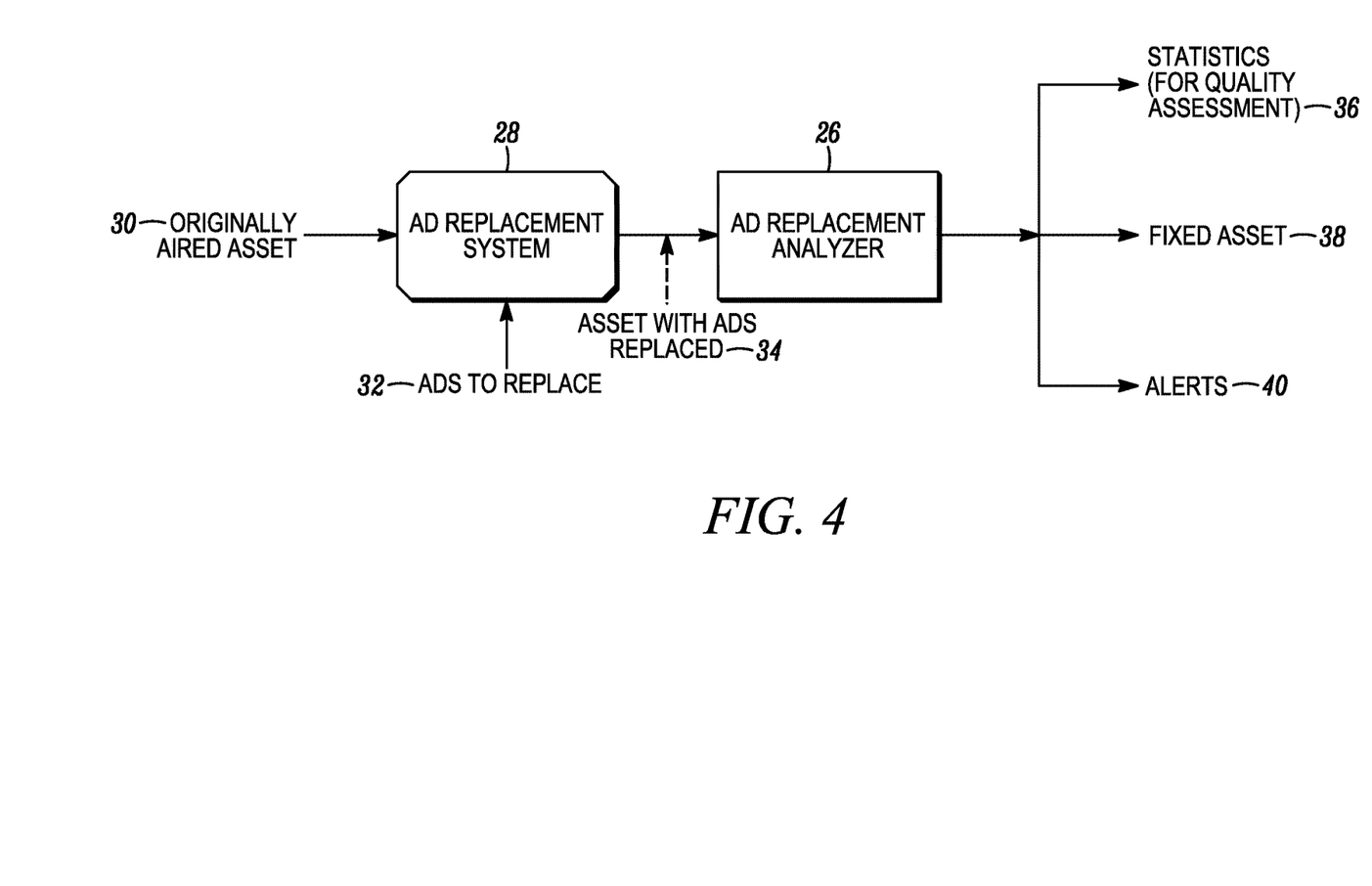
FIG. 4 is a schematic representation of a first embodiment of an ad replacement system in combination with an ad replacement analyzer in accordance to an embodiment.
Figure 5:
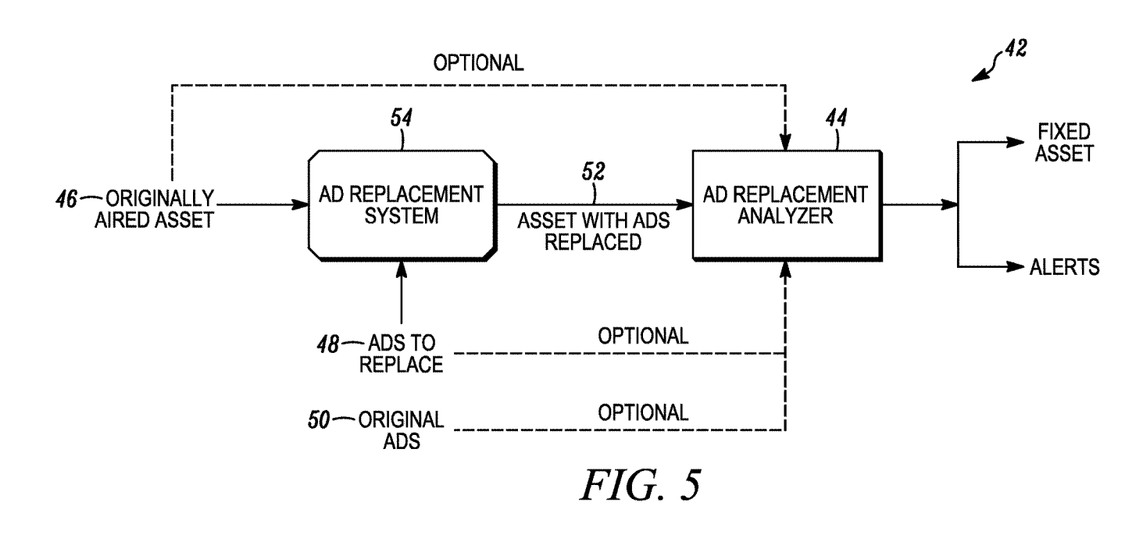
FIG. 5 is an alternate schematic representation of a second embodiment of an ad replacement system in combination with an ad replacement analyzer in accordance to an embodiment.
Figure 6:
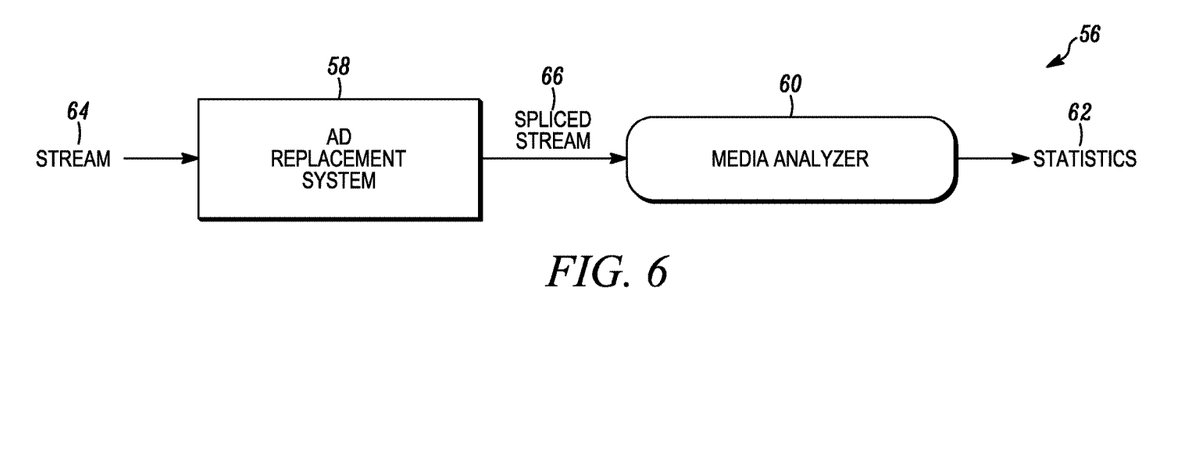
FIG. 6 is an alternate schematic representation of a third embodiment of an ad replacement system in combination with an ad replacement analyzer in accordance to an embodiment.

According to embodiments shown in FIGS. 4, 5 and 6, the system is configured to detect imperfect ad replacements within a modified or spliced stream provided by an ad replacement system or the like and to provide a manner for gathering statistics concerning such imperfections or for correcting, removing or mitigating such imperfections.

For instance, FIG. 4 provides an embodiment of a system 24 for monitoring ad replacements in which a media analyzer, such as ad replacement analyzer 26, is positioned downstream of an ad replacement system 28 and receives the output thereof. For example, an originally-aired, recorded, or existing asset or multimedia stream 30 and one or more replacement ads 32 may be input into the ad replacement system 28 for purposes of generating a modified asset or multimedia stream 34 having selected advertisements in the original asset 30 replaced with replacement ads 32 such as discussed above with respect to FIGS. 2 and 3. The video, audio, and text streams of the modified asset 34 are received by the media analyzer 26 which evaluates the modified asset 34 via media analysis for purposes of detecting whether or not the replacement ads 32 are properly or improperly positioned (i.e., offset within the stream from the intended position needed to completely overlap and replace an original advertisement in the original stream).

As shown in FIG. 4, the media analyzer 26 may be configured to generate different types of outputs based on an analysis of the modified stream 34. For instance, the media analyzer 26 may generate statistics 36 relevant to the quality of the ad replacements in the modified asset 34, may automatically correct or mitigate poor quality ad replacements in the modified asset 34 to produce a fixed asset 38, and/or may generate alerts 40 of instances of poor quality ad replacements to enable correction by post-processing equipment or personnel or the like downstream of the media analyzer 26. For the purpose of generating statistics 36 relevant to the quality of the ad replacements, the media analyzer may analyze two or more, preferably a high number, of instances of ad replacements. In one embodiment, one of such statistics 36 could be the ratio of ad replacements failure; i.e., the number of ad replacements with failure divided by the total number of ad replacements analyzed.

For purposes of analyzing the modified asset 34, the media analyzer 26 may be configured to extract various video, audio, and/or text features from the modified asset 34 to determine a likelihood of poor or failed ad replacement. For example, the media analyzer 26 may receive the modified asset 34 in the form of a multimedia stream having a replacement ad which may only partially overlap an original ad in the originally-aired asset 30. One or more audio, video, and text features may be extracted from the multimedia stream, particularly adjacent the first or last video frame of the replacement ad to determine if any residual and unwanted part of the original ad remains in the stream as modified.

According to some embodiments, the media analyzer 26 initially determines the boundaries of the original ad in the original asset 30, if available, and/or determines the boundaries of the replacement ad in the modified asset 34. By way of example, ad boundaries may be determined by detecting sequences of black video frames with corresponding silence in audio. Alternatively, ad boundaries may be determined by comparing the original asset 30 with the modified asset 34 to detect where the video or audio in the multimedia stream has been changed. In some cases, the ad boundary may be identified by the detection of a sequence of visually distinct marker frames present in the stream.

If a replacement ad is placed before an intended time in the original stream, then black frames and silent audio of an ad boundary or marker frame may not exist in a modified asset or stream. In this case, if databases of the original ads and of the new ads are available, then the media analyzer may detect errors by comparing the video frames of an original ad with the video frames immediately preceding the replacement advertisement.

According to one embodiment, after an ad boundary is detected, such as the boundary adjacent to the first frame of an original ad, the media analyzer 26 analyzes the video frames and audio of the modified asset 34 for a predetermined period "T" of normal speed playing time of the video or a predetermined number of video frames following the ad boundary or before the ad boundary. By way of example, the predetermined period "T" may correspond to 0.5 seconds of playing time of the video at normal speed following an ad boundary. In this case, if a hard cut from one segment to the next is detected within the predetermined period "T", the media analyzer 26 may diagnose this as a potential failure in ad replacement. A hard cut refers to a dramatic change in the characteristics of video and/or audio as may be experienced when one segment or advertisement ends and another begins.

For example, a failure may be determined when a hard cut in the transition from a residual of an original ad to the replacement ad is detected within the predetermined period "T" following the ad boundary. This provides an indication that the splice point of the replacement ad was slightly offset or delayed from the proper placement. In some embodiments, the likelihood of the hard cut being a failure may be based on a decreasing function of "T". Here, the closer the hard cut is to the ad boundary within the period "T", the greater the likelihood of a failure and not an intended cut within the advertisement.

The likelihood of the above referenced ad replacement failure may be further evaluated and/or confirmed by determining whether or not audio characteristics during the above referenced predetermined period "T" are different from audio characteristics immediately following the predetermined period, for instance, for the remainder of the replacement advertisement. One example of audio features that characterize the audio characteristics is features based on Mel Frequency Cepstrum Coefficients (MFCC). In one embodiment, statistics regarding the MFCC coefficients extracted during the above referenced predetermined period "T" are compared against statistics regarding the MFCC coefficients extracted after the above referenced predetermined period "T". In one embodiment, such statistics may represent means and variances and a high difference among the means and/or variances would cause an increase in the likelihood of ad replacement failure generated or diagnosed by the media analyzer 26.

Alternatively or in addition to the use of audio characteristics, video characteristics such as Color Layout (CL), Edge Histograms, etc. in the predetermined period "T" may be compared to video characteristics immediately following the predetermined period "T". If the above referenced audio and/or video characteristics are significantly different, then the likelihood of a detected hard cut being a failure may be elevated.

The above referenced video characteristics may be visual descriptors or image descriptors of the visual features of the contents in images, video frames, or videos. The features may be used to describe elementary characteristics such as shape, color, texture or motion. Color Layout Descriptors (CLDs) and Edge Histogram Descriptors (EHDs) provide two examples of features that can be used. A set of Color Layout Descriptors (CLDs) can be used to capture spatial distribution of color in an image or frame of video, and a set of Edge Histogram Descriptors (EHDs) can be used to capture the texture of an image. Accordingly, when such features or descriptors of two similar images or sequences of video frames are compared, the comparison will produce a similarity metric indicating high similarity. In contrast, when such features or descriptors of two significantly different images or sequences of video are compared, the comparison will produce a similarity metric indicated low or no similarity.

Accordingly, a divergence between a CL coefficient histogram within the predetermined period "T" from an ad boundary and a CL coefficient histogram immediately following the predetermined period "T" to the end of the replacement ad (i.e., until the next black frame) is computed and if the divergence is high, the likelihood of ad replacement failure determined by the media analyzer 26 is increased. If the divergence of the above referenced feature fails to meet a minimum predetermined threshold of divergence, the media analyzer 26 may take no action. However, if the divergence of the above referenced feature reaches the minimum predetermined threshold but fails to meet a greater predetermined threshold of divergence, the media analyzer 26 may simply generate an alert regarding the detected failure. Alternatively, if the divergence of the above referenced feature reaches the greater predetermined threshold of divergence and therefore is considered significant, the media analyzer 26 may automatically take steps to modify the stream in an attempt to correct or mitigate the misplacement of the spliced ad.

In some instances, the media analyzer 26 may analyze video frames and audio of the modified asset 34 for a predetermined period "T" of regular speed playing time or a predetermined number of frames before a detected ad boundary. In this case, if a hard cut from one segment to the next is detected within the predetermined period "T", the media analyzer 26 may diagnose this as a potential failure in ad replacement. For example, a failure may be determined when a hard cut in the transition from the end of a replacement ad to a residual tail end of an original ad is detected within the predetermined period "T" preceding the ad boundary. In some embodiments, the likelihood of the hard cut being a failure may be based on a decreasing function of "T". As before, the likelihood of the above referenced failure may be further confirmed by determining whether or not audio characteristics during the above referenced predetermined period "T" are different from audio characteristics immediately before the predetermined period "T". Alternatively or in addition thereto, video characteristics such as Color Layout (CL), Edge Histograms, etc. in the predetermined period "T" may be compared to video characteristics immediately before the predetermined period "T". If the above referenced video characteristics are significantly different, then the likelihood of the detected hard cut being a failure may be increased.

In addition to video and audio features, text features may be obtained from the modified stream 34 to assist in a determination of whether or not a residual part of a replaced advertisement unintentionally remains in the stream. For instance, if an advertisement actually has a hard cut within the "T" period analysis window, the frames before the hard cut could be mistaken for a residual. According to one embodiment, such a mistake may be avoided by analyzing (i.e., comparing) closed caption text within the stream corresponding to video frames before the hard cut with captions corresponding to video frames after the cut within the ad. In this case, if similar text is detected, the hard cut may not be considered the result of an ad replacement failure, and the likelihood of ad replacement failure would be reduced by the media analyzer 26. Alternatively, the detection of dissimilar text may be used to elevate a likelihood of ad replacement failure.

In some embodiments, closed caption text within the "T" period of seconds from the ad boundary may be compared to closed captioned text after the "T" period of seconds of the boundary. If there is a high similarity between words within the "T" period of seconds and the words after the "T" period of seconds, then the likelihood of ad replacement failure may be diminished.

For purposes of automatically correcting a detected ad replacement failure as discussed above, video frames of the modified asset 34 from the detected ad boundary to the first detected hard cut within the predetermined period "T" may be automatically replaced with black frames or the like. Thus, for instance, the video frames in FIG. 3 from the end of Ad1 to the beginning of Ad4 may be replaced with black frames. As an alternative to the use of black frames, the last frame of the advertisement or program segment immediately preceding the ad boundary may be repeated multiple times and fading may be applied to the repeated video frame. For example, the video frames in FIG. 3 from the end of Ad1 to the beginning of Ad4 may be replaced with the last frame of Ad1 which may or may not be subject to fading. In particular, the repeated last frame may contain information useful to the viewer, such as phone number, Internet address, or the like of which is of value to be displayed for an extended time.

In a case where the failure is detected adjacent to an end of the replacement ad, video frames from a detected hard cut in the period "T" to the ad boundary following the replacement ad may be automatically replaced with black frames or the last video frame of the replacement ad may be repeated with or without fading to the ad boundary.

Further, in a stream including visually distinct marker frames that identify transitions between a program segment and a start or end of an advertisement, marker frames existing within the stream may be detected and replaced with new marker frames with or without replacement advertisements. In addition, if a failure occurs such that ad frames are mistaken for marker frames and the splicing point of a replacement ad occurs within the ad being replaced, a residual part of the ad being replaced will remain in the stream. In this case, the stream 34 would have two marker frames: the original marker frame and the marker frame of the replacement advertisement. In the case of a failure in which the replacement ad is delayed, the original marker frame would precede the new marker frame. In this case, correction of such a failure may include replacing all the frames from the original marker frame until the frame immediately before the new marker frame with black frames or with a repeated frame from the preceding advertisement. In the case of a failure in which the replacement ad is included before its intended time, the new marker frame adjacent the end of the replacement ad would precede an original marker frame. In this case, correction of such a failure may include replacing all the frames from the end of the new marker frame until the last frame of the original marker frame with black frames or with a repeated frame from the replacement ad or of the new marker.

FIG. 5 illustrates an embodiment of a system 42 similar to system 24 shown in FIG. 4 except that the media analyzer 44 may receive or have access to the originally aired asset 46, a set or a database of replacement ads 48, and/or a set or a database of the original ads 50 in the original asset 46.

In a case where none of the original asset 46, the original ads 50, and the replacement ads 48 are provided to the media analyzer 44, the media analyzer 44 may be configured to detect instances of the same advertisement that is repeated at different points within a modified asset 52 received from the ad replacement system 54. For example, video frame comparison techniques may be used to identify an advertisement that is repeated at various points within the modified asset 52. After this is accomplished, a predetermined number of video frames (e.g., the first 100 video frames) of each of the same advertisement repeated in the modified asset or stream 52 may be compared. If any of the ads in this subset has initial video frames different than the initial frames of the other ads in the subset, a failure in ad replacement may be declared by the media analyzer 44. As before, depending on the severity of the ad replacement failures detected, the media analyzer 44 may generate statistics, issue an alert and/or automatically replace the initial frames with black frames or the like.

In a case where an original ad 50 is provided to the media analyzer 44, an ad replacement failure may be detected by comparing the initial or ending frames of the original ad 50 with the frames after or before the ad boundary of the modified asset 52. Here, if the frames of the original ad 50 are found after or before the ad boundary in the modified asset 52, an ad replacement failure is identified. As a possible result, the media analyzer 44 could replace all of the frames that matched the original ad 50 in the modified asset 52 with black frames or the like.

In a case where the entire original asset 46 is provided to the media analyzer 44, the media analyzer 44 may extract the video frames of the original ad 50 from the original asset 46 before proceeding as described above in the case where the original ad 50 is directly provided to the media analyzer 44.

In a case where a database of the original ads 50 and a database of the replacement ads 48 are available to the media analyzer 44, the media analyzer 44 may be configured to detect errors by comparing video frames of each of the original ads 50 with video frames immediately before and after the replacement ads existing within the modified asset 52.

Accordingly, the media analyzer 44 may access any one, any two, or all the originally aired asset 46 (i.e., before ad replacement), a database of original ads 50, and a database of replacement ads 48 in the process of determining the existence and/or likelihood of an ad replacement failure.

FIG. 6 represents a system 56 including an ad replacement system 58 and a media analyzer 60 configured to output statistics 62 relative to successful ad replacements and/or failures thereof by methods discussed above. For instance, stream 64 is input into the ad replacement system 58 which outputs a stream 66 spliced with replacement ads. The stream 66 is evaluated by methods discussed above and statistics are generated and forwarded to other equipment or personnel. In this embodiment, ad replacement or splicing is accomplished upstream of the media analyzer 60 and the statistics characterize how well the ad replacement has performed. Any correction of identified failures may be corrected by other equipment receiving the statistics 62.

Figure 7:
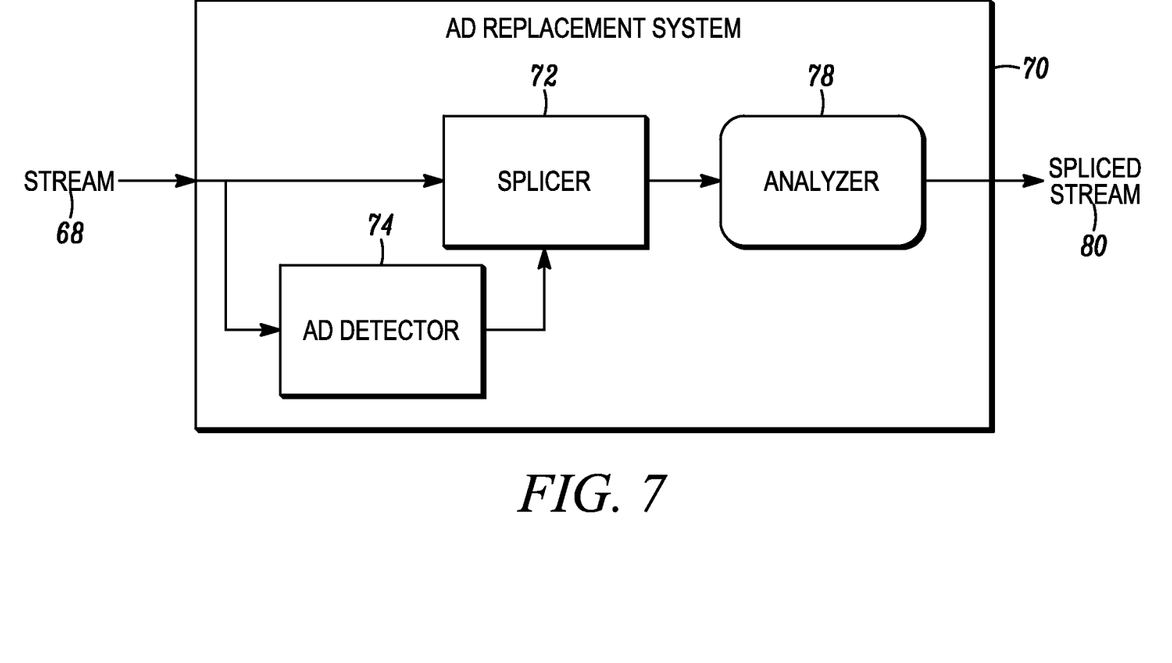
FIG. 7 is a schematic representation of a fourth embodiment of an ad replacement system including an analyzer in accordance to an embodiment.
Figure 8:
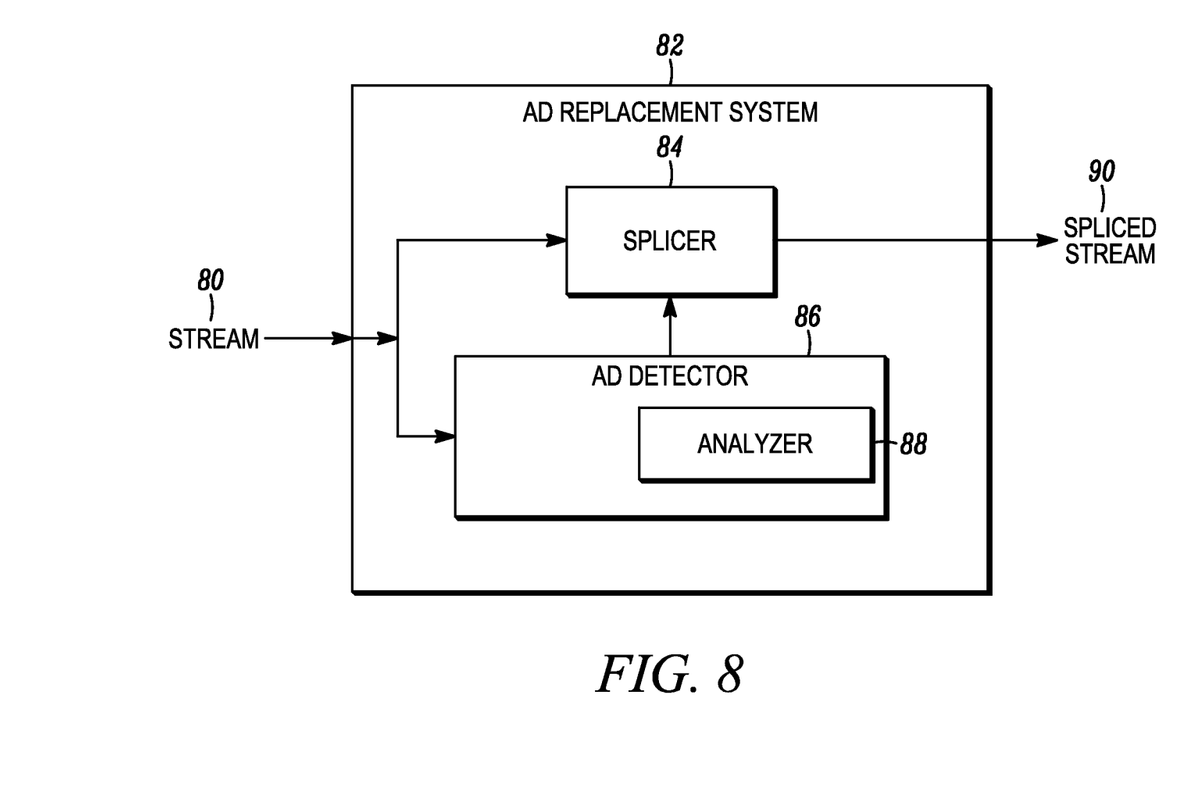
FIG. 8 is a schematic representation of a fifth embodiment of an ad replacement system including an analyzer in accordance to an embodiment.
Figure 9:
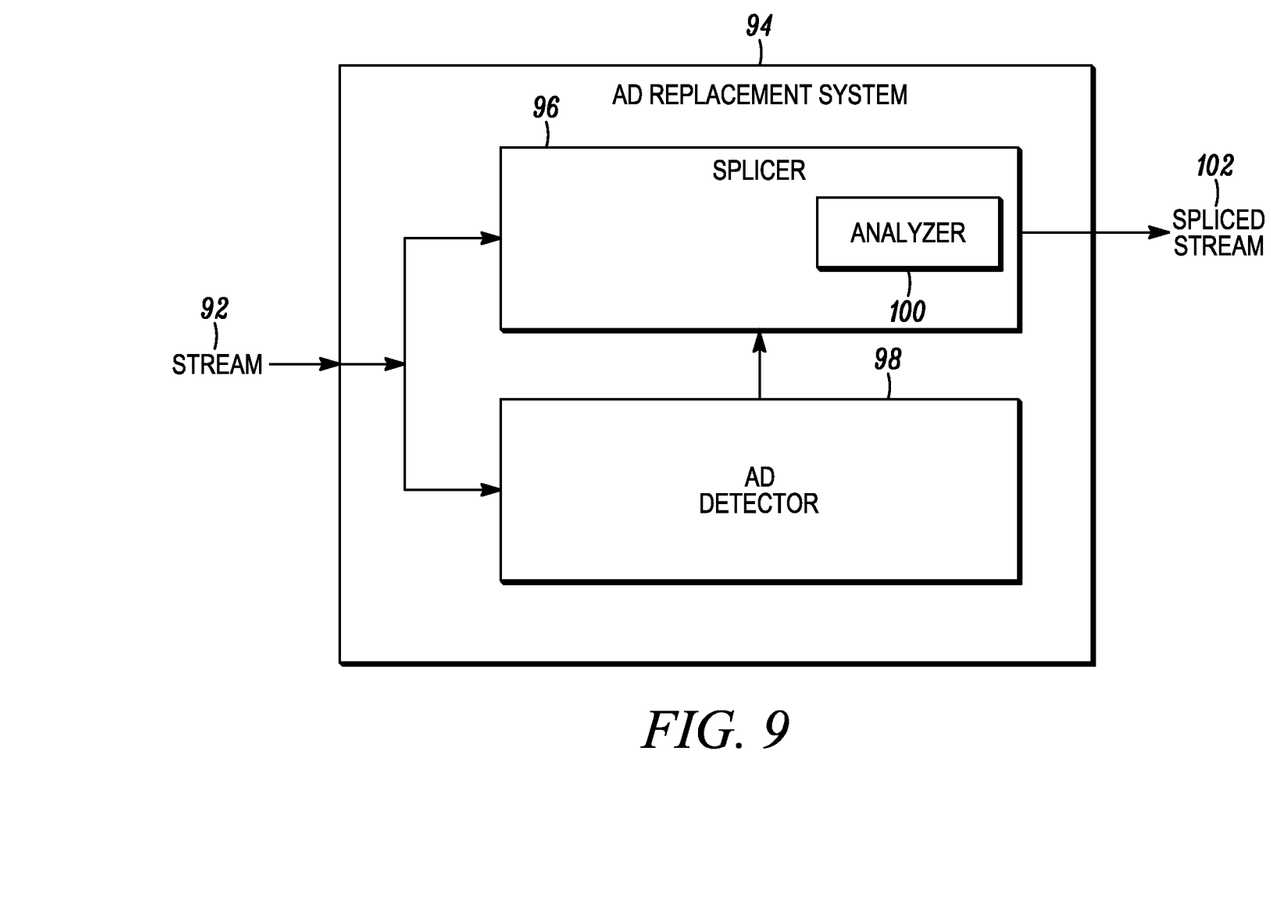
FIG. 9 is a schematic representation of a sixth embodiment of an ad replacement system including an analyzer in accordance to an embodiment.

FIGS. 7, 8 and 9 are directed to embodiments in which the evaluations discussed above are performed within the ad replacement system. With respect to these embodiments, the term "splicing" refers to the act of changing a multimedia stream by overwriting new content into the stream and the term "splicer" refers to equipment that performs splicing operations. In addition, the term "ad replacement" refers to the process of using a splicer to overwrite an ad with a new ad, and the term "ad detector" refers to the process of identifying where one or more ads are located within the multimedia stream that is input to the splicer. In these embodiments, the output of the ad detector is input into the splicer.

For instance, in FIG. 7 an original stream 68 is fed into an ad replacement system 70 such that the stream is input into a splicer 72 and an ad detector 74. The ad detector 74 identifies where ads are located in the stream 68 and provides this information to the splicer 72 which then splices new content into the stream 68. This modified stream having spliced content is provided to a media analyzer 78 which performs an evaluation as discussed above. If a splicing failure is detected by the media analyzer 78, the stream is repaired as discussed above. Thus, a fully repaired spliced stream 80 is output from the media analyzer 78 and from the ad replacement system 70.

As an alternative, in FIG. 8, an original stream 80 is fed into an ad replacement system 82 such that the stream 80 is input into a splicer 84 and an ad detector 86. In this embodiment, a media analyzer 88 forms a part of the ad detector 86. Thus, evaluation of the stream 80 as discussed above is performed before a decision is made by the ad detector as to the location of ad boundaries.

Thus, the process of identifying the one or more ads within the multimedia stream 80 may include a step of defining a set of frames, times, or points within the multimedia stream 80 that represent candidate frames, times, or points corresponding to the start and end of ads. In most cases, the set of candidate frames, times, or points for the start and end of an ad will contain more frames, times, or points than the actual start and end frames, times, or points of ads existing in the multimedia stream. After the candidates are defined, a subset of the candidate frames, times, or points are selected to represent the actual start and end times of the ads. This selection may be based on an extraction of video, audio and/or text features as discussed above taken adjacent to the candidate frames, times or points so as to ensure the selected candidates correspond to ad boundaries. Thus, the process of selecting a subset of frames, times, or points considers the analysis of the multimedia stream and uses the output of this analysis in order to increase or reduce the preference (likelihood) of selecting a particular candidate frame, time, or point over another.

Accordingly, the ad detector 86 identifies where ads are located in the stream 80, the media analyzer 88 evaluates stream 80 as part of ad detection, and this information is provided to the splicer 84 which then splices new content into the stream 80. This modified stream 90 having spliced content is then output from the splicer 84 and the ad replacement system 82.

As a further alternative, an original stream 92 as shown in FIG. 9 is fed into an ad replacement system 94 such that the stream 92 is input into a splicer 96 and an ad detector 98. The ad detector 98 identifies where ads are located in the stream 92 and provides this information to the splicer 96 which in this embodiment includes a media analyzer 100. Thus, evaluation of the stream 92 as discussed above is performed before and/or during splicing.

Thus, splicing failure detection and correction through media analysis can be conducted by the media analyzer 100 such that video frames, audio and/or text are analyzed in a period within "T" seconds or number of frames before and after each splicing point (e.g., T=0.5 s). If a hard cut is detected within the "T" period, a failure in splicing is identified having a likelihood that is a decreasing function of "T". If the audio characteristics in the "T" period are different than the audio characteristics after the "T" period, likelihood of splicing failure is confirmed and increased. If video characteristics (e.g., Color layout, Edge Histograms, etc.) in the "T" period are significantly different than the video characteristics after the "T" period, likelihood of splicing failure is confirmed and increased. By way of example, if the likelihood of splicing failure does not meet a predetermined threshold, no corrective action may be taken. Alternatively, if the likelihood of splicing reaches the predetermined threshold, the splicing point may be adjusted to the location of the detected hard cut within +/−T for the purpose of reducing or minimizing the likelihood of splicing failure. Accordingly, the splicer 96 then splices new content into the stream 92 and this modified stream 102 having spliced content is then output from the splicer 96 and the ad replacement system 94.

Figure 10:
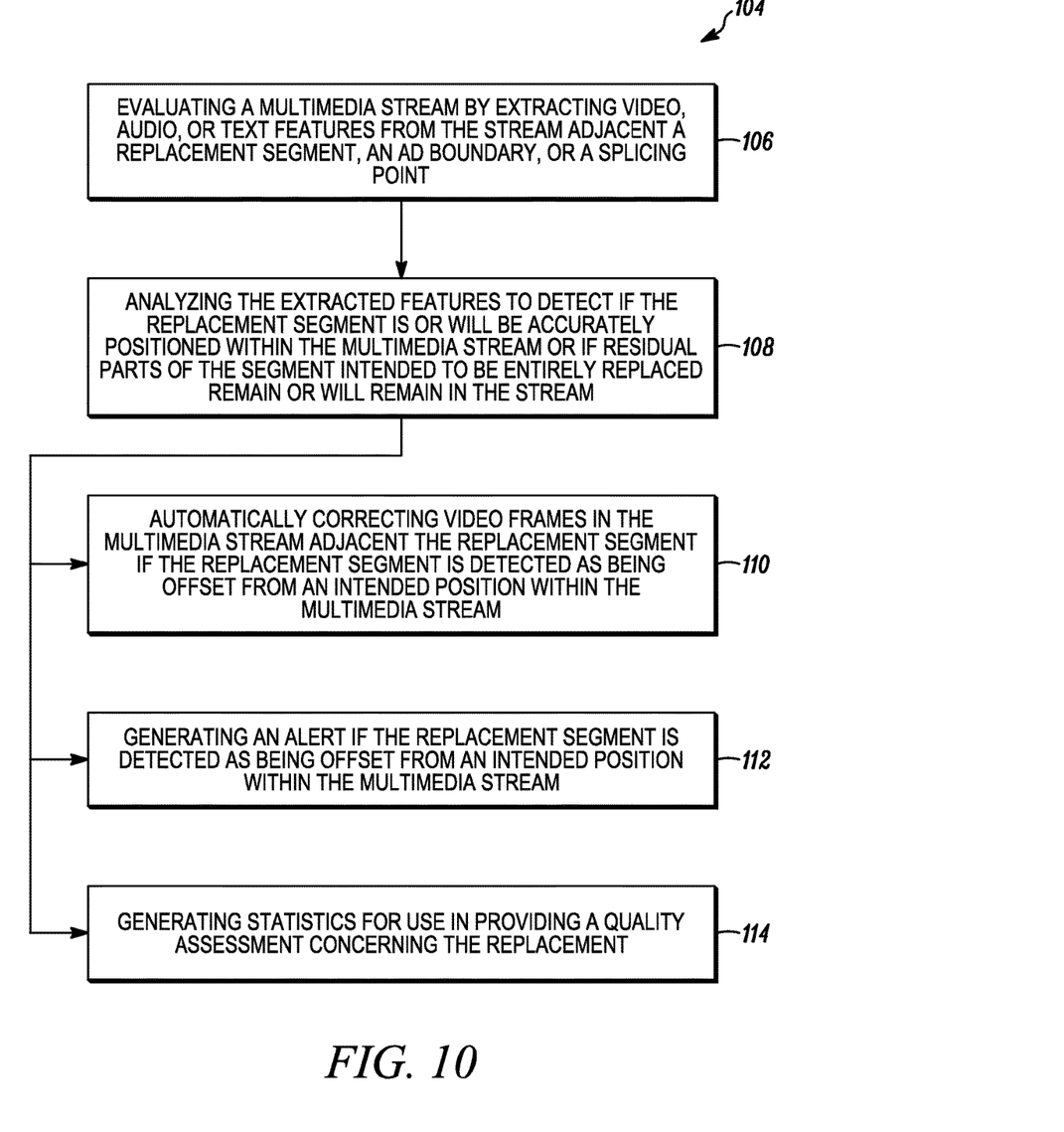
FIG. 10 is a flowchart of a process for detecting and/or correcting ad replacement failures within a multimedia stream in accordance to an embodiment.

FIG. 10 provides a flowchart of an embodiment of a method 104 for monitoring segment replacement within a multimedia stream. The multimedia stream is a stream that has or had a segment (i.e., such as an original segment) that was or is intended to be replaced with a replacement segment. Thus, the stream has been subject to modification or is being modified. The method 104 includes an evaluation 106 via media analysis of the multimedia stream including extracting at least one of video, text, and audio features from the multimedia stream adjacent (i.e., immediately before and/or after) the replacement segment, an ad boundary, or a splicing point and analyzing 108 the extracted features to detect if the replacement segment is or will be accurately positioned within the multimedia stream or if residual parts of the segment intended to be entirely replaced remain or will remain in the stream.

The method may optionally include a step 110 of automatically correcting video frames in the multimedia stream adjacent the replacement segment if the replacement segment is detected as being offset from an intended position within the multimedia stream, a step 112 of generating an alert if the replacement segment is detected as being offset from an intended position within the multimedia stream so that personnel or downstream apparatus is notified of the offset, or a step 114 of generating statistics for use in providing a quality assessment concerning an offset of the replacement segment if the replacement segment is detected as being offset from an intended position within the multimedia stream.

The evaluating step 106 may include a step of determining a boundary within the multimedia stream between a segment in the multimedia stream adjacent to and directly in front of or directly behind the segment intended for replacement by the replacement segment. This may include the detection of sequences including black frames within video frames and silent audio of the multimedia stream. Alternatively, this may include the detection of marker frames. As a further alternative, this may include comparing the multimedia stream having the replacement segment with a previous version of the multimedia stream including the segment intended for replacement.

The analyzing step 108 may also include analyzing video frames and audio of the multimedia stream for a predetermined period "T" of the multimedia stream following or before the detected boundary for purposes of detecting a transition between video and audio features of the segment intended for replacement and a beginning or ending of the replacement segment. In addition, the evaluating step 106 may include detecting differences between audio features of the multimedia stream during the pre-determined period "T" and audio features of the multimedia stream directly following or before the pre-determined period "T" and/or detecting differences between video features of the multimedia stream during the pre-determined period "T" and video features of the multimedia stream directly following or before the pre-determined period "T". As examples, the audio features may include statistics of MFCC coefficients, and the video features may include at least one of a Color Layout Descriptor (CLD), a color histogram, and an Edge Histogram Descriptor (EHD). Text features may also be extracted and compared as discussed above.

While the principles of the invention have been described above in connection with specific devices, apparatus, systems, and/or methods, it is to be clearly understood that this description is made only by way of example and not as limitation. One of ordinary skill in the art will appreciate that various modifications and changes can be made without departing from the scope of the claims below. Accordingly, the specification and figures are to be regarded in an illustrative rather than a restrictive sense, and all such modifications are intended to be included within the scope of the present invention.

The above referenced devices for carrying out the above methods can physically be provided on a circuit board or within another electronic device and can include various processors, microprocessors, controllers, chips, disk drives, and the like. It will be apparent to one of ordinary skill in the art that the analyzers, systems, splicers, ad detectors, modules, processors, controllers, units, servers, agents, and the like may be implemented as electronic components, software, hardware or a combination of hardware and software. While some devices and processors may be described or depicted herein as separate entities, the functions may be combined into fewer or greater number of physical entities.

An embodiment may include at least one non-transitory computer readable storage medium having computer program instructions stored thereon that, when executed by at least one processor, can cause the at least one processor to perform any of the steps described above.

The word "comprise" or a derivative thereof, when used in a claim, is used in a nonexclusive sense that is not intended to exclude the presence of other elements or steps in a claimed structure or method. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of monitoring segment replacement within a multimedia stream, comprising steps of:
    evaluating a multimedia stream having a replacement segment spliced therein, the evaluating step including extracting at least one of video, text, and audio features from the multimedia stream adjacent a beginning or ending of the replacement segment;
    analyzing the features to detect if a residual of a segment replaced by the replacement segment exists within the multimedia stream; and
    determining a boundary within the multimedia stream between the replacement segment and an adjacent segment in the multimedia stream;
    wherein the multimedia stream is analyzed during the analyzing step to determine if a hard cut transition is present within a predetermined period of video before or after the boundary, and wherein the analyzing step includes comparing text in closed captioning before the hard cut transition and after the hard cut transition.

2. The method according to claim 1, further comprising the step of generating an alert if the residual of the segment replaced by the replacement segment is detected within the multimedia stream during the analyzing step.

3. The method according to claim 1, further comprising the step of generating quality assessment statistics based on results of the analyzing step concerning accuracy of splicing location of the replacement segment in the multimedia stream.

4. The method according to claim 1, further comprising the step of automatically correcting video frames in the multimedia stream adjacent the replacement segment if the replacement segment is detected as being offset from an intended position within the multimedia stream during the analyzing step.

5. The method according to claim 4, wherein said step of automatically correcting video frames includes replacing video frames of the residual with at least one of black video frames, marker frames, frames repeating a last video frame of an adjacent segment, and video frames with a fading effect.

6. The method according to claim 1, wherein the step of determining the boundary includes at least one of detecting for sequences including black frames and silent audio, detecting for sequences of visually distinct marker frames, and comparing the multimedia stream having the replacement segment with a previous version of the multimedia stream including the segment intended for replacement by the replacement segment.

7. The method according to claim 1, wherein the analyzing step includes detecting differences between at least one of audio, video and text features of the multimedia stream during the predetermined period and at least one of audio, video and text features of the multimedia stream directly preceding or following the predetermined period.

8. The method according to claim 1, wherein video features are extracted from the multimedia stream and include at least one of a Color Layout Descriptor (CLD), a color histogram, and an Edge Histogram Descriptor (EHD).

9. The method according to claim 1, wherein audio features corresponding to statistics of Mel Frequency Cepstrum Coefficients (MFCC) are extracted from the multimedia stream.

10. A method of segment replacement within a multimedia stream, comprising steps of:
    evaluating a multimedia stream by extracting at least one of video, text, and audio features from the multimedia stream adjacent a location within the multimedia stream;
    analyzing the features to detect for at least one of a segment boundary and a splicing point within the multimedia stream; and
    splicing a replacement segment within the multimedia stream following the segment boundary or at the splicing point;
    wherein the location is a splicing point and the features are extracted from a predetermined period before and following the splicing point, wherein the features are evaluated to determine a presence of a hard cut transition within the predetermined periods, and wherein the splicing point is adjusted if the hard cut transition is detected in the predetermined periods.

11. The method according to claim 10, further comprising the steps of defining a plurality of candidate locations within the multimedia stream which represent at least one of a starting point and ending point of a segment to be replaced within the multimedia stream, and selecting at least one of the candidate locations as a segment boundary based on the analyzing step.

12. An advertisement replacement system comprising one or more processors configured for digital video processing of a multimedia stream, the one or more processors further configured to provide:
    an advertisement detector configured to receive the multimedia stream;
    a splicer configured to receive information from the advertisement detector; and
    a media analyzer configured to evaluate the multimedia stream at one of before, during, and after advertisement replacement, the media analyzer being configured to extract at least one of video, text, and audio features from the multimedia stream and analyze the features for determining at least one of a segment boundary, a splicing point, and an offset of advertisement replacement;
    wherein the media analyzer is configured to extract at least one of video, audio, and text features from predetermined periods before and following a splicing point within the multimedia stream to determine a presence of a hard cut transition within the predetermined periods, and to adjust the splicing point if the hard cut transition is detected in the predetermined periods.

13. The advertisement replacement system according to claim 12, wherein the media analyzer is configured to receive a multimedia stream having a replacement segment spliced therein, extract at least one of video, text, and audio features from the multimedia stream adjacent a beginning or ending of the replacement segment, and analyze the features to detect if a residual of a segment replaced by the replacement segment exists within the multimedia stream.

14. The advertisement replacement system according to claim 13, wherein the media analyzer is configured to accomplish at least one of generating an alert if the residual of the segment replaced by the replacement segment is detected within the multimedia stream, generating quality assessment statistics concerning accuracy of splicing location of the replacement segment in the multimedia stream, and automatically correcting video frames in the multimedia stream adjacent the replacement segment if the replacement segment is detected as being offset from an intended position within the multimedia stream.

15. The advertisement replacement system according to claim 12, wherein the media analyzer is configured to analyze a plurality of candidate locations within the multimedia stream which represent at least one of a starting point and ending point of a segment to be replaced within the multimedia stream and select at least one of the candidate locations as a segment boundary.

* * * * *